United States Patent [19]

Berge

[11] Patent Number: 5,379,510
[45] Date of Patent: Jan. 10, 1995

[54] MULTISPINDLE MACHINE FOR PROCESSING WORKPIECES

[76] Inventor: Hallvard Berge, Vendomveien 2, N-1165 Oslo, Norway

[21] Appl. No.: 90,174

[22] PCT Filed: Jul. 15, 1993

[86] PCT No.: PCT/NO92/00010

§ 371 Date: Aug. 27, 1993

§ 102(e) Date: Aug. 27, 1993

[87] PCT Pub. No.: WO92/12816

PCT Pub. Date: Aug. 6, 1992

[30] Foreign Application Priority Data

Jan. 18, 1991 [NO] Norway .................................. 910207

[51] Int. Cl.⁶ .................... B23Q 7/00; B21D 43/10; B23B 47/18
[52] U.S. Cl. .................................. 29/564; 83/277; 408/70; 409/163
[58] Field of Search .................... 29/564, 33 P, 26 A, 29/563; 408/69, 70, 31, 61, 33, 34; 409/138, 163, 164; 83/277, 157, 234

[56] References Cited

U.S. PATENT DOCUMENTS

| | | | |
|---|---|---|---|
| 2,019,848 | 11/1935 | Ferris et al. | 83/234 X |
| 3,449,991 | 6/1969 | Daniels | 83/277 X |
| 3,512,438 | 5/1970 | Burdge | 83/277 X |
| 4,106,183 | 8/1978 | Brulund | 29/564 |
| 4,512,380 | 4/1985 | Schmidt | 409/80 |
| 4,603,611 | 8/1986 | Ferguson | 83/277 X |
| 4,610,582 | 9/1986 | Amos et al. | 409/163 |
| 4,709,605 | 12/1987 | Clark | 83/157 X |

FOREIGN PATENT DOCUMENTS

| | | | |
|---|---|---|---|
| 0292712 | 11/1988 | European Pat. Off. | |
| 1332673 | 6/1963 | France | 408/61 |
| 05709 | 6/1989 | WIPO | |

*Primary Examiner*—William Briggs
*Attorney, Agent, or Firm*—Sughrue, Mion, Zinn, Macpeak and Seas

[57] ABSTRACT

A computerized numerically controlled drilling and milling machine has a worktable 2, 3 for supporting a workpiece 41, one or more tool assemblies 10, 11, 26 for processing the workpiece, and feeding and guiding devices 8, 9; 24, 25; 27, 43 arranged to provide for positioning and simultaneous relative movement between the tool assemblies and the workpiece in a longitudinal as well as a transverse direction. The worktable is in two parts, and the tool assemblies are arranged on the guiding devices in a transversely extending intermediate space 4 between the parts. Further, a clamping and feeding device 30, 44, 27, 43 for the workpiece is provided on each side of the intermediate space for successive alternating feeding of the workpiece.

7 Claims, 3 Drawing Sheets

MULTISPINDLE MACHINE FOR PROCESSING WORKPIECES

BACKGROUND OF THE INVENTION

The present invention relates to a machine for processing of workpieces, comprising a worktable for the support of a workpiece, one or more tool assemblies for processing of the workpiece, and feeding and guiding means arranged to provide for positioning and simultaneous relative movement between the tool assemblies and the workpiece in a longitudinal as well as a transverse direction of the workpiece.

The invention especially deals with drilling and milling machines, and more particularly such machines of the so-called computerized numerically controlled type (CNC machines). Such machines are used within the industry especially for processing of workpieces of wood, and are provided with one or more tool spindles for contour or edge shape milling, for drilling or milling for fittings, for groove milling, etc.

There are previously known different types of CNC milling machines which all have in common that they are provided with a stationary worktable having removable vacuum cups or vacuum fastenings for the workpiece, and further are provided with a longitudinally and a transversely extending sliding guide for relative movement between the tool assemblies and the workpiece in a longitudinal direction (along an X axis) and a transverse direction (along a Y axis) of the workpiece.

The known machines are of two principal types: in one type, the longitudinally extending sliding guide moves the worktable on which the workpiece is fixed or clamped. In the other type, the longitudinally extending sliding guide moves the transversely extending sliding Guide in the X-axis direction along the workpiece, this being stationarily fixed in relation to the machine frame. In both machine types one is precluded from placing an underlying sliding guide with tool spindles below the workpiece, so that this, in these types of machines, cannot be processes from all six sides.

As mentioned above, the workpieces in the known machines during the processing are fixed to stationary worktables by means vacuum cups or vacuum fastenings. This is a substantial obstacle to being able to utilize such a machine in a rational way. The placing of the vacuum fastenings in relation to the workpieces is time-consuming, and one always must try to place these as close as possible to the processing site—the edge of the workpiece—in order to obtain a sufficient clamping. At the same time it has to be ensured that no fastenings are in the way of the milling tool.

When there is one or a small number of workpieces of the same size which is to be processed, this placing of vacuum fastenings will take a disproportionately long time of the total working time for each workpiece.

It should also be mentioned that the length of the workpieces is limited in relation to the machine length or the length of the worktable.

SUMMARY OF THE INVENTION

On this background the main object of the invention is to provide a CNC drilling and milling machine which will eliminate the above-mentioned deficiencies and drawbacks of the CNC drilling and milling machines which are commercially available today.

A more particular object of the invention is to provide such a machine which is without the time-consuming vacuum cups or corresponding fastening means for securing of the workpiece during the processing.

Another object is to provide a machine giving the possibility of continuous processing of workpieces, and processing of workpieces which are without any length restriction, so that the machine may also be constructed with a length which, in principle, is independent of the length of the workpiece.

A further object is to provide such a machine giving the possibility of simultaneous processing of the workpieces from all six sides, i.e. the upside, the underside and the four edge sides.

The above-mentioned objects are achieved with a machine of the introductorily stated type which, according to the invention, is characterized in that the worktable is in two parts and the tool assemblies are arranged on a guiding means in a transversely extending intermediate space between the worktables, and that a means for clamping and feeding of the workpiece is provided on each side of the transverse intermediate space, the clamping and feeding means being arranged for successive alternating feeding of the workpiece, the forward means, as viewed in the feeding direction, being arranged to take over the workpiece when this has been fed to a suitable take-over position by the rearward means.

In the machine according to the invention the two separate means for clamping and feeding can be activated and fed individually, or fed synchronously with each other. The first clamping means, as viewed in the feeding direction, can fetch and feed workpieces which are taken over and fed further by the second clamping and feeding means, so as to achieve said successive alternating feeding which appropriately can be termed "relay feeding". This is considered to represent a quite new principle in this field. By means of the relay feeding system combined with the bipartite worktable with the transverse intermediate space for the tool assemblies, one achieves that the machine can drill and mill at any place on a plate-like workpiece, and carry out contour and format milling, with or without curves.

BRIEF DESCRIPTION OF THE DRAWINGS

The invention will be further described below in connection with an exemplary embodiment with reference to the accompanying drawings, wherein.

DETAILED DESCRIPTION OF THE PREFERRED EMBODIMENT

Figure 1:
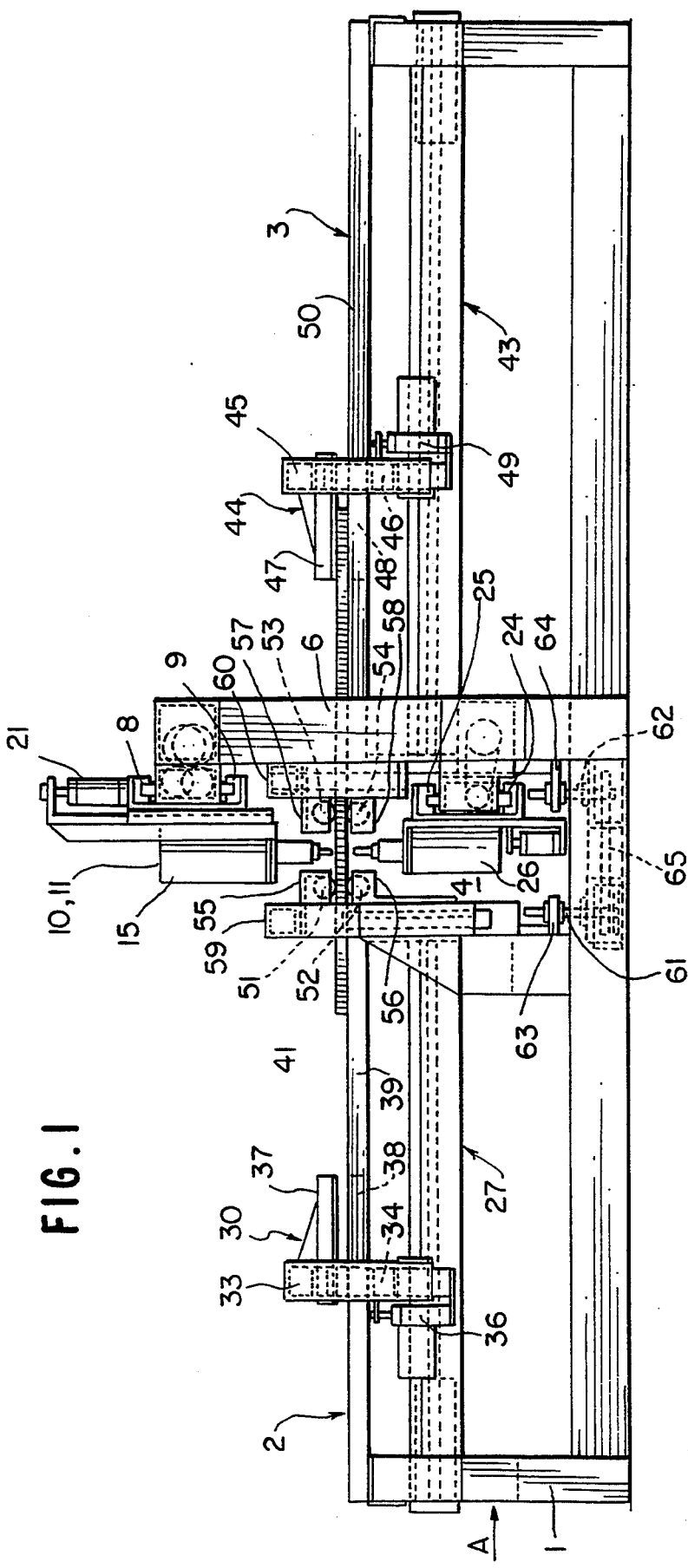
FIG. 1 shows a schematic side view of an embodiment of a machine according to the invention.

In the drawings, a CNC drilling and milling machine according to the invention is shown in schematic form, parts not being considered to be essential for the understanding of the invention, being partly left out. As mentioned, the machine is numerically controlled and to this end provided with a computer and an associated operator console having a keyboard for programming, etc. However, these units are not shown or further described, since they may be of a conventional type and well known to a person skilled in the art. The driving and operating means of the machine preferably are of the electric/pneumatic type, and details in this connection are also omitted, since an expert will know how these parts of the machine may be constructed.

The removal system of the machine for removal of waste material, such as shavings and chips of wood, neither is shown in the drawings. This will, however, in its entirety be arranged centrally at the intermediate space of the machine, since all processing tools are operating in this region. Thereby a relatively compact and simple removal system is made possible.

Such as appears from the drawings, the machine includes a main frame 1 supporting the various machine elements. Thus, the frame supports a stationarily worktable which is in two parts and comprises a first and a second worktable 2 and 3, respectively, which are stationary mounted on the frame 1 on either side of a transversely extending intermediate space 4 in the central region of the machine. At one side of the central region there is arranged a transversely extending gantry consisting of a pair of upright columns 5 and 6, respectively, and a cross beam 7 for the support of a guide means for tool assemblies for processing of workpieces. As shown, the guide means consists of a double sliding guide 8, 9 for guiding of a pair of tool assemblies 10 and 11, respectively, transversely to the feeding direction of the workpieces, for processing of the workpieces from the upside thereof. The tool assemblies may be of a conventional type and in the illustrated embodiment include a pair of driving motors 12, 13 and 14, 15, respectively, having work spindles, e.g. 16 and 17, for drilling, milling or the like. As suggested, each driving motor is attached to a vertically displaceable bracket, so that the tool spindles may be raised and lowered in the vertical plane, and thereby positioned in a Z axis direction in accordance with the current program for processing of workpieces being fed. Said positioning is carried out by means of pneumatic cylinders 18, 19, 20, 21.

The movement of the tool assemblies 10, 11 along the sliding guides 8, 9 takes place by means of a suitable feeding means, e.g. spherical-nut screw feeders, driven by means associated motors 22, 23.

In the transversely extending intermediate space 4 between the worktables 2 and 3 there is made space for an underlying guide means which also consists of a double sliding guide 24, 25 extending parallel with the overhead sliding guide 8, 9, for guiding of tool assemblies 26 (only one shown in the drawings) in a manner corresponding to that of the overhead guide. These lower tool assemblies may be executed and work in a manner corresponding to that described above, and preferably are moved by a feeding means of their own (not shown) having a separate control.

With this arrangement the machine can process a workpiece both on the upside and underside and all four side edges during the feeding thereof, and in this connection carry out contour and format milling, with or without curves.

In the illustrated embodiment the sliding guides 8, 9 and 24, 25 for the tool assemblies are stationary and extend transversely to the transverse intermediate space 4. However, there may also be contemplated an embodiment wherein the sliding guides, especially on the upper side of the workpiece, is pivotally arranged, so that the sliding guides may be positioned in a suitable desired angle, e.g. 45°, to the feeding direction of the workpiece. This will be advantageous in the processing of certain types of workpieces, for instance string boards, in that it results in a simplified tool control and a quicker execution of the working operations of interest, e.g. milling of grooves for steps.

The clamping or fixing of workpieces and the feeding thereof through the machine takes place by a means which is in two parts, corresponding means being arranged on each side of the intermediate space 4 between the worktables 2 and 3, as viewed in the feeding direction. In the illustrated embodiment each of these means consists of a feeding means having an associated clamping means. Thus, under one worktable 2 there is provided a longitudinally extending guide 27 consisting of a double sliding guide 28, 29 for guiding of a clamping means 30 by a suitable feeding means (e.g. a screw feeder) 31 having an associated driving motor 32.

The clamping means 30 comprises an upper and a lower gripping finger holder 33 and 34, respectively, extending transversely to the worktable 2 respectively above and below the table. The lower holder 34 is supported by and fixed to the sliding guide 28, 29, whereas the upper holder 33 at its outer ends is connected to the lower holder via pneumatic cylinders 35, 36, so that it can be lowered and raised in relation to the lower holder, for clamping and release, respectively, of workpieces. To the upper holder 33 there are fixed a number of gripping fingers 37, and to the lower holder 34 there are fixed a corresponding number of gripping fingers 38, the gripping fingers extending in the feeding direction and being directed towards the transversely extending intermediate space 4 of the machine. The gripping fingers 38 on the lower holder 34 are located in respective interspaces between mutually parallel beams or rods 39 constituting the worktable 2, and move in these interspaces during movement of the clamping means 30. The upper gripping fingers 37 on their underside are provided with cushioning means 40 which, advantageously, are in the form air cushions, for resting against the upside of clamped workpieces 41, 42 to be fed. In this manner an efficient gripping action for the clamping means is obtained across the whole worktable, also with a certain variation of the thickness of the workpieces across the width.

As regards the means for clamping and feeding of workpieces in connection with the other worktable 3, this corresponds, as mentioned, to the means described above, and is only partly shown in the drawings. However, it appears from FIGS. 1 and 2 that the feeding means comprises a longitudinally extending guide 43, and that the clamping means 44 comprises upper and lower gripping finger holders 45, 46 having associated gripping fingers 47, 48, and pneumatic cylinders 49 (only one visible in the Figures) for activation and deactivation of the means. The lower gripping fingers 48 are located in respective interspaces between mutually parallel beams or rods 50 constituting the worktable 3.

It will be clear that the above embodiment having gripping finger holders and associated gripping fingers, represents only one possible embodiment. The gripping fingers are advantageous when processing short workpieces, the fingers being able to be moved close to the work spindles. However, the gripping fingers may be omitted, the gripping means itself for example being able to consist of only a pair of transversely extending, jaw-forming rod elements.

Instead of using a clamp or jaw for feeding of the workpieces, as shown and described above, there may, as an alternative, be used vacuum fastenings, e.g. vacuum cups, on the upside or underside of the workpiece, according to what might be best suitable in relation to the workpieces, and depending on the type of work. If only drillings and millings which do not require interpolation of axes are to be effected, that is, a pure positioning, then for example vacuum feeding—or relay feeders based on vacuum—will be preferable.

Figure 2:
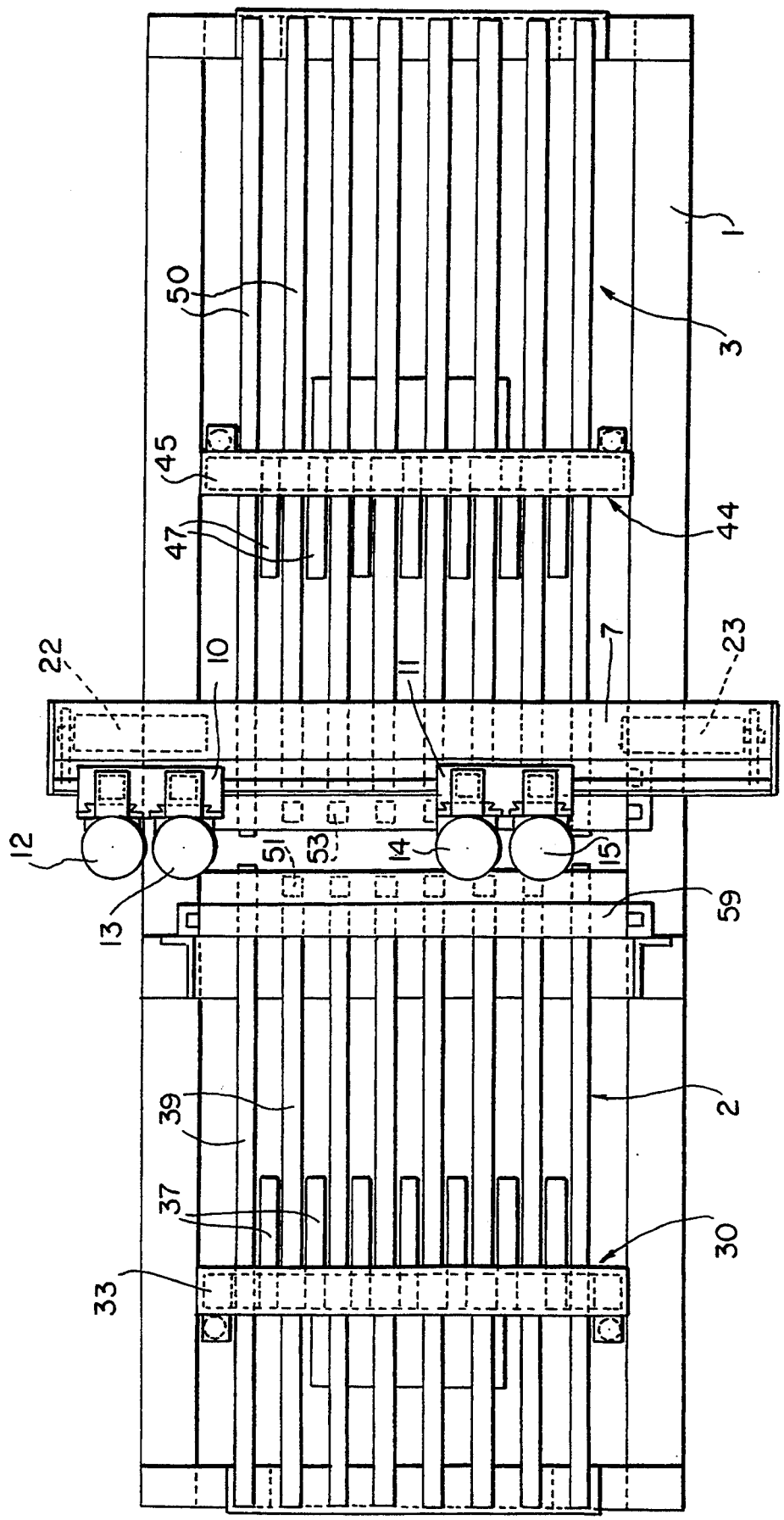
FIG. 2 shows a plan view of the machine in FIG. 1.

In the intermediate space 4 of the machine, workpieces under processing will not be supported by the worktables 2 and 3. In order to obtain a stable support of the workpieces also in this region, two cooperating pairs of guide rollers 51, 52 and 53, 54, respectively, are provided between the worktables. The rollers are supported by respective bearing brackets 55, 56 and 57, 58 which are attached to respective gantry-like carrier members 59, 60 which are in turn fixed to the machine frame 1. The upper rollers 51, 53 are resiliently mounted, for exerting a suitable pressure on workpieces passing between the roller pairs. Further, for adaptation to workpieces having different heights, the bearing brackets 55, 57 with the rollers 51, 53 are height adjustable. As shown in FIG. 1, the height adjustment in the illustrated embodiment takes place by means of adjusting screws 61, 62 which are in threaded engagement with transition elements 63, 64, the adjusting screws being operated simultaneously by means of a motor-driven chain means 65.

As an alternative to the above described means for clamping and feeding of workpieces, one might also contemplate to use driven rollers, for example by connecting the shown roller pairs 51, 52 and 53, 54 to respective driving means which are driven synchronously and in an alternating manner, so that the aforementioned relay feeding is achieved.

Figure 3:
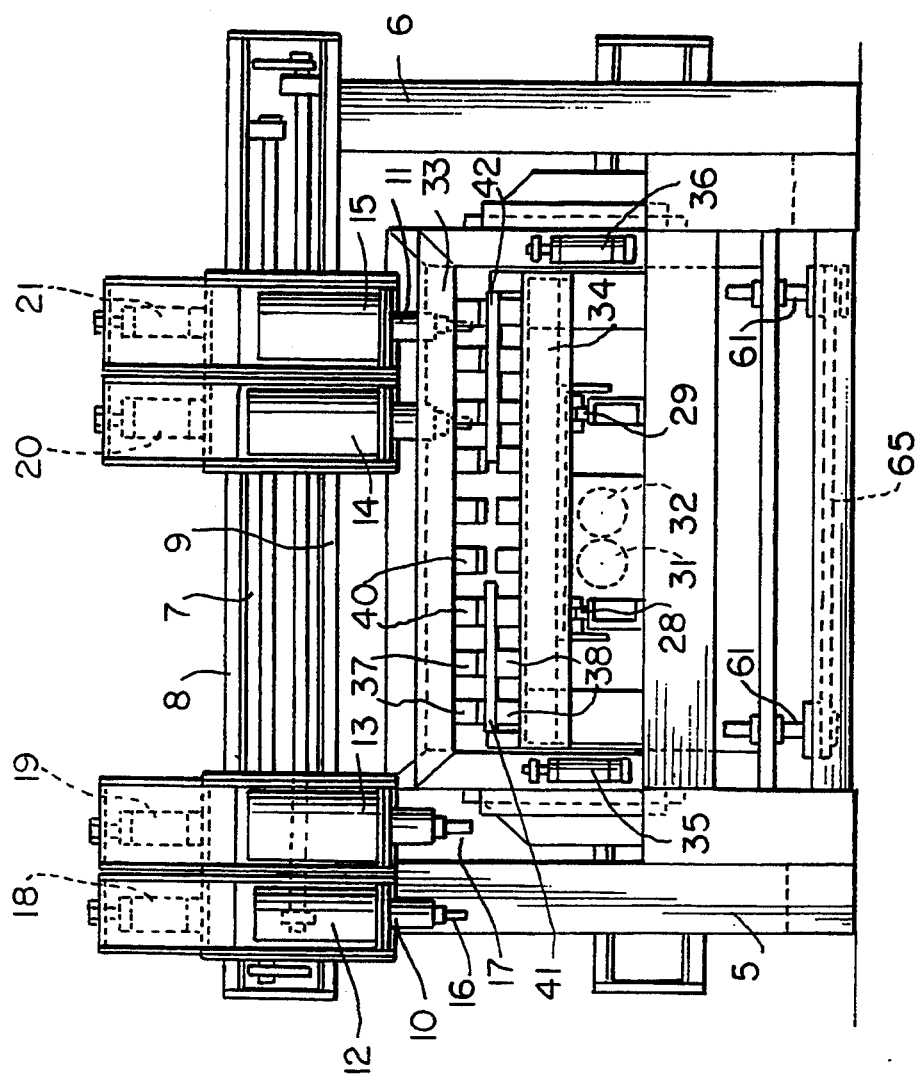
FIG. 3 shows an end view of the machine as viewed in the direction of the arrow A in FIG. 1.

It appears from FIG. 3 that the clamping means 30, 44 in non-activated, i.e. non-clamping, condition, have an open passage in the longitudinal direction of the machine, so that a workpiece can be carried through the clamping means in this condition. Thereby workpieces having an unlimited length can be fed and processed in the machine, the two clamping means alternatingly gripping and feeding the workpieces.

In operation of the illustrated machine, a workpiece is fixed to e.g. the clamping means 30, and the workpiece is fed forwards to the work spindles 16, 17 where the processing starts in accordance with the programming of the CNC control. By means of a limit switch or a chosen program, the other clamping means 44, which is located at a suitable position on the other side of the work spindles, is put in action and grips the workpiece, and for a short time this will be clamped simultaneously in both clamping means. The feeding means for both sliding guides 27 and 43 all the time will be controlled with exactly the same feeding speed from the CNC control. After said short time, the clamping means 30 on the input side will be released from the workpiece, and will be returned to the initial position to fetch another workpiece. On the output or pulling-out side the clamping means 44 will pull the workpiece further forwards, and the processing thus takes place without any stop or standstill.

As mentioned above, one of the clamping means returns to the initial position to fetch another workpiece. However, this machine function is also used when a workpiece has such a length that it cannot be processed to finished condition with only one alternation. Generally, there will be used as many alternations as are necessary for processing "infinitely" long workpieces.

As mentioned, both sliding guides 27 and 43 are equipped with their own feeding means with an associated driving motor (servo-motor), and also with a pulse transmitter (not shown) for control purposes. When one pulse transmitter is disconnected in connection with an alternation, the other is automatically connected, and the counting—the pulse delivery—then functions during the whole alternation process. Alternatively, there may be provided only one pulse transmitter which is common to both sliding guides and feeding means, and which is then connected alternatingly to the feeding means which is to be controlled.

When using only one pulse transmitter, which is common to both feeding sliding gates, racks are attached at the side of both slides (only at one side), and outside of the working region of the machine, which racks both act on a toothed wheel fixed to the shaft of the pulse transmitter. When one feeding slide carries a workpiece forwards, the rack attached thereto is in engagement with the toothed wheel of the pulse transmitter. The rack on the other feeding slide, which may now be on its way back, now is lifted out from the toothed wheel, for example by means of compressed air. During the alternation both racks will be in engagement with the toothed wheel.

It will be appreciated that, with the feeding system of the machine according to the invention, both the forward and the rearward end of a workpiece can be processed and shaped with a CNC control in all three axis directions (X, Y, Z) during one and the same passage through the machine.

The relay feeding system further makes it possible to build a relay machine in two or more stages, for example in two stages, and accordingly with four relays. In such a machine the first stage may, for example, execute only format processings or those processings requiring interpolation of axes or curve millings, together with those drilling or milling operations on the upside of the workpiece which might be necessary.

After the first relay has taken the workpiece into the first machine stage for format processing, the second relay continues to feed the workpiece forwards to the third relay which then takes over and feeds the workpiece forwards to the second machine stage. In this stage all drilling from the underside is carried out, and in addition millings and drillings for fittings occurring at all four side edges. If necessary, this stage of course also may carry out processing on the upside. Thus, also in this "working zone" it is possible to process a workpiece from six sides, i.e. the upside and underside, both lateral or side edges and the forward and rearward sides of the workpiece. After finished processing in the second stage, the fourth relay takes over and feeds the workpiece further, for final discharge or further feeding to an additional processing stage.

With such a machine construction, wherein the feeding of the workpiece between the working zones takes place with the ordinary relay feeding system, one can in a simple manner achieve a continuous working process with a quite substantial increase of capacity. The fact is that when the work is divided into working zones, the working process proper becomes simpler, and all operations with the tool are considerably simplified.

In the previous description the invention especially has been disclosed in connection with drilling and milling machines. The relay principle according to the invention can, however, also be used in connection with other types of workpiece-processing machines. Therefore, the expression "tool assembly" in this context should be interpreted in a wide sense, and thus is meant to include, for example, also a cutting or sawing device, e.g. a circular saw or the like, which may be overlying or underlying in relation to the worktable.

I claim:

1. A machine for processing workpieces, comprising:
   a) a bipartite worktable for the support of a workpiece,
   b) tool assemblies movably arranged on transverse guiding means in an intermediate space between the worktables, for processing the workpiece,
   c) a clamping and feeding means on each worktable for engagement with transverse side edges of the workpiece, and for feeding the workpiece during the processing thereof, and
   d) at least one cooperating pair of upper and lower guiding and pressure applying means arranged in said intermediate space, for the stable support of the workpiece in said intermediate space,
   e) said clamping and feeding means being mounted on longitudinally extending guiding means and arranged to clamp the workpiece separately or simultaneously, and being independently movable for positioning the workpiece during processing and for successive alternating feeding of the workpiece, a forward one of the clamping means, as viewed in a feed direction, being arranged to take over the workpiece when said workpiece has been fed to a suitable take-over position by a rearward one of the clamping means.

2. A machine according to claim 1, wherein transverse guiding means with associated tool assemblies are arranged above and below the workpiece in said intermediate space, to enable processing of the workpiece both from the upside, the underside and all four side edges.

3. A machine according to claim 1, wherein said clamping means are open in the longitudinal direction of the workpiece, to allow passage of the workpiece through the clamping means in a non-activated condition thereof.

4. A machine according to claim 1, wherein each of said clamping means comprises an upper and a lower gripping finger holder extending transversely of the worktable and comprising a number of gripping fingers extending in the longitudinal direction, the lower gripping fingers being arranged to be moved in respective interspaces between mutually parallel rods constituting the worktable.

5. A machine according to claim 4, wherein said upper gripping fingers on undersides thereof are provided with cushioning means for resting against an upper side of clamped workpieces.

6. A machine according to claim 1, wherein each of the longitudinal guiding means comprises a feeding slide arranged to actuate a respective pulse transmitter.

7. A machine according to claim 1, wherein said longitudinal guiding means comprise respective feeding slides arranged to actuate a common pulse transmitter.

* * * * *